July 21, 1925.

C. A. NERACHER

MOTOR CYCLE

Filed March 15, 1923　　2 Sheets-Sheet 1

Inventor
Carl A. Neracher

July 21, 1925.　　　　　C. A. NERACHER　　　　　1,547,158
MOTOR CYCLE
Filed March 15, 1923　　　2 Sheets-Sheet 2
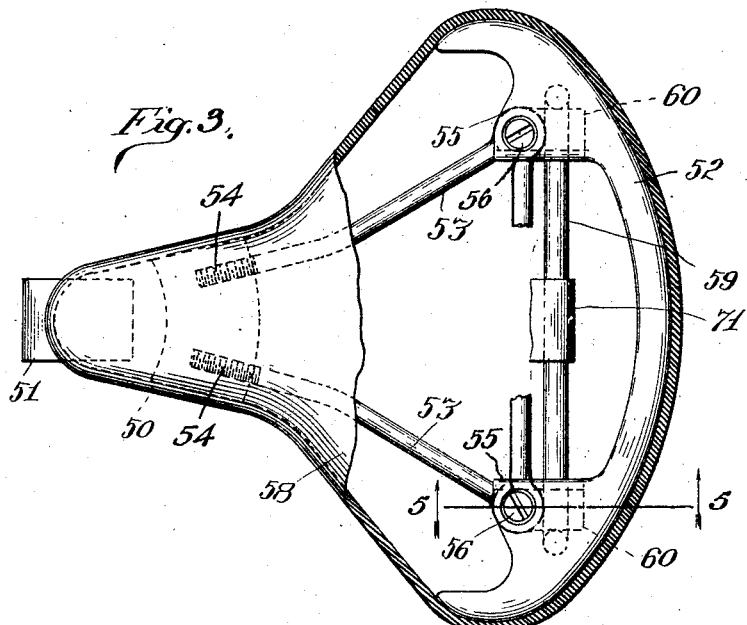
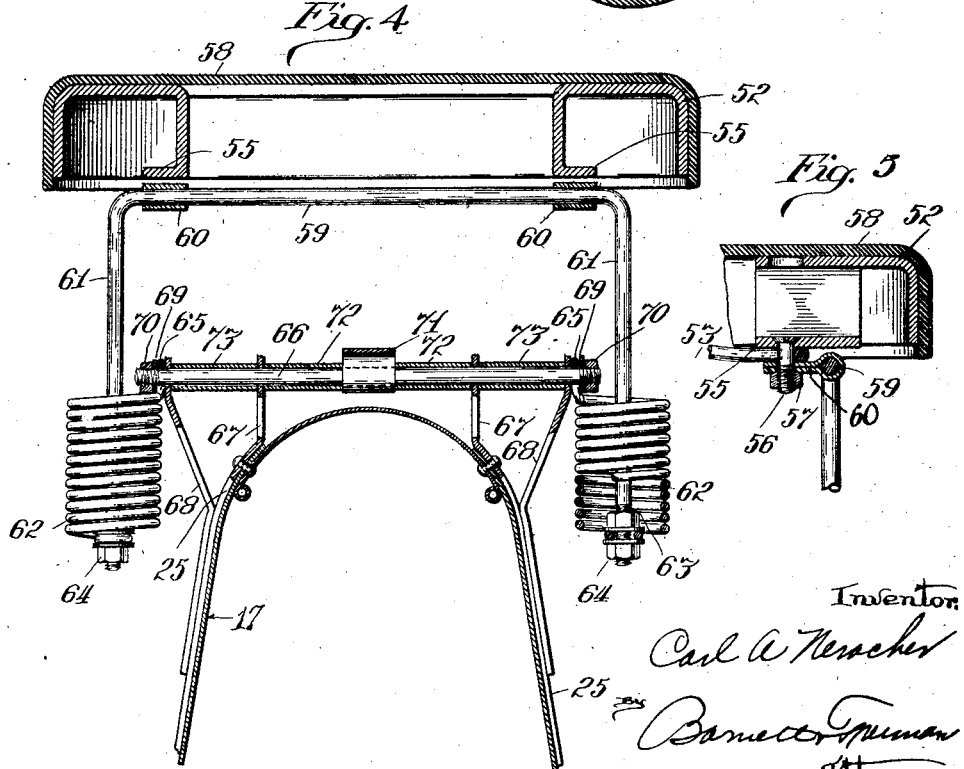

Patented July 21, 1925.

1,547,158

UNITED STATES PATENT OFFICE.

CARL A. NERACHER, OF SYRACUSE, NEW YORK, ASSIGNOR TO NER-A-CAR CORPORATION, A CORPORATION OF NEW YORK.

MOTOR CYCLE.

Application filed March 15, 1923. Serial No. 625,249.

*To all whom it may concern:*

Be it known that I, CARL A. NERACHER, a citizen of the United States, residing at Syracuse, in the county of Onondaga and State of New York, have invented certain new and useful Improvements in Motor Cycles, of which the following is a specification.

My invention relates to a seat or saddle for a bicycle, motorcycle, or like vehicle and the primary object of the invention is to provide a new and improved seat or saddle of such construction as to be strong and durable while effectively cushioning the movements of the rider due to inequalities of the road. In particular the saddle is arranged so that the movement of the rider under the cushioning action of the spring are substantially vertical movements. In other words, the rider is not tilted forwardly or backwardly when the weight of the rider is imposed suddenly on the saddle in passing over an obstruction. This up-and-down movement in cushioning is more comfortable and interferes less with the control of the machine than if the saddle had any appreciable angular movement under the yielding of its spring.

The saddle of my invention is illustrated, in a preferred embodiment and as forming part of a motorcycle, in the accompanying drawings, wherein Fig. 1 is a side elevation of the rear portion of a motorcycle provided with a saddle constructed in accordance with my invention.

Fig. 3 is a plan view of the saddle with parts in section.

Fig. 4 is a sectional view, on an enlarged scale, taken on line 4—4 of Fig. 1, and Fig. 5 is a detail sectional view on line 5—5 of Fig. 3.

Figure 1:
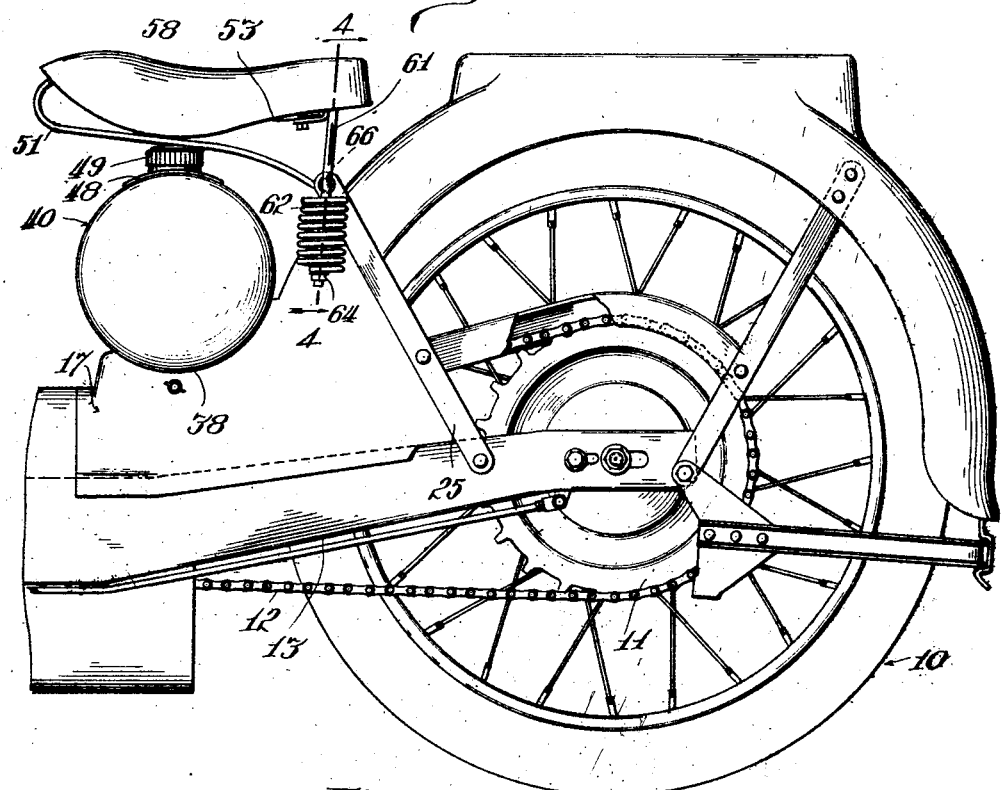
Figure 2:
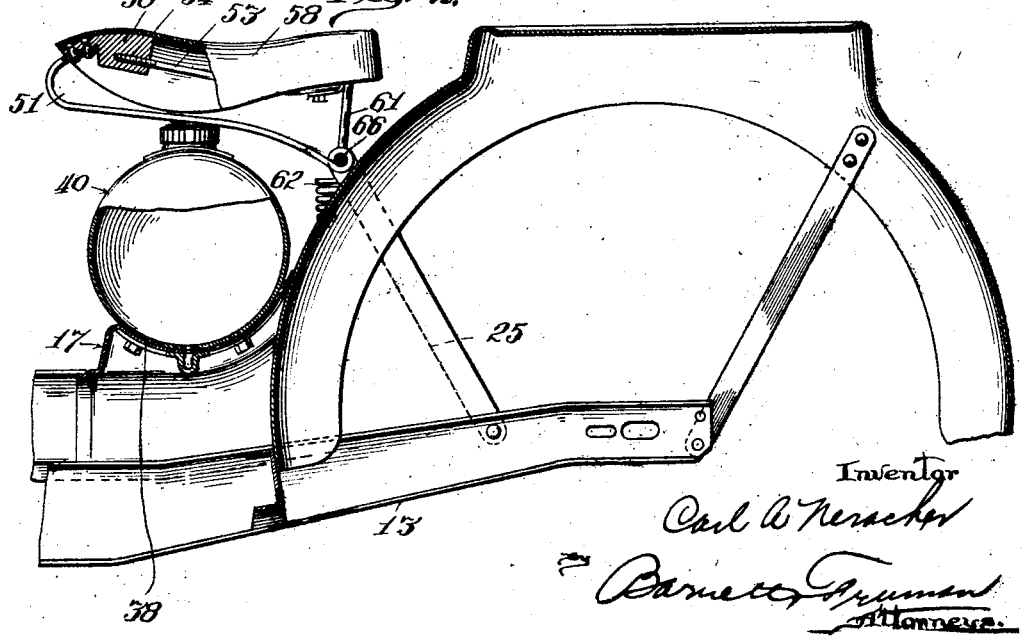
Fig. 2 is a longitudinal sectional view of this part of the machine with the rear wheel and driving chain omitted, certain parts being shown in elevation.

Referring to the drawings, 10 designates the rear wheel of the motorcycle which is shown as provided with a sprocket 11 for a driving chain 12.

The motorcycle as shown is of the low suspension type and comprises a frame which is arranged at substantially the level of the front and rear wheel centers.

Supported on the side frame members 13 and fastened thereto by riveting, welding, or other suitable means, is a hollow pressed steel member 17 formed on the top with a curved recess 38 extending across said member from side to side for supporting a fuel tank 40 provided at the top with a filling opening through the nipple casting 48, the latter being threaded for a closure cap 49. The construction of the motorcycle forms no part of the herein claimed invention which is confined to the saddle or seat construction, the parts of the motorcycle here shown being claimed in my application Sr. No. 480,770 hereinafter referred to.

The saddle is carried by a leaf spring, the rear end of which is pivoted to the motorcycle body and the front end attached to the frame of the saddle, the spring bearing at an intermediate point on the filling cap 49 of the fuel tank. The saddle frame comprises, preferably, a pommel casting 50 to which the forward end of the leaf spring 51 is secured, and a rear frame 52 connected to the casting 50 by a stiff wire 53, the extremities of which are threaded into the casting 50 at 54 while the middle portion is clamped to lugs 55 on the back frame by means of screws 56 and nuts 57. 58 designates the leather covering of the saddle. 59 is a yoke secured to the rear frame of the saddle by keepers 60 which are held in place by the screws 56 and nuts 57 above mentioned, the yoke 59 comprising downwardly projecting legs 61 which extend through coiled springs 62, the lower turns of which are anchored to the legs of the yoke by pairs of nuts 63, 64, while the upper turns of the springs are formed with loops 65 extending around a transverse rod 66. This rod extends through perforations in the upper ends 67 of the braces 25 at the back edges of hollow member 17, these braces being formed so as to extend a short distance above the hollow member as shown. The rod 66 is further supported by strap brackets 68 riveted to the braces 25 and to the edges of the hollow member. The loops 65 on the springs 62 are held between the brackets 68 and washers 69 by nuts 70. The rear end of the leaf spring 51 is formed with a loop 71 which extends around the rod 66. Spacers 72, 72 intervene between the loop 71 and the extensions 67 of braces 25 and spacers 73, 73 between the extensions 67 and brackets 68.

This application is a continuation in part of my co-pending application Serial No. 332,243 filed October 21, 1919, and of application Serial No. 480,770, filed June 27, 1921.

The location of the fuel tank provides a convenient bearing for the leaf spring 51 of the saddle, thereby making feasible the use of a saddle of the particular type described. The leaf spring 51 is pivoted at its rear end to the body of the motorcycle and bears at a point intermediate its ends upon the filling cap or other suitable part of the fuel tank or upon any other suitable support. As a result of this arrangement the oscillatory movements of the saddle, when road inequalities are encountered, are substantially vertical movements. This not only adds to the comfort of the rider but also to the safety of operation of the machine since a tilting of the saddle forwardly or backwardly, necessarily interferes with the steering of the machine and the other handle bar controls more than movements which are up and down. The rider is less likely to be unseated or his position on the saddle disturbed. By hinging or pivoting the rear end of the spring 51 the saddle may be turned backwardly in order to give access to the filling opening of the tank. When the saddle is thus turned back the coiled springs 62 providing a resilient support for the rear of the saddle, which is preferable, can also turn with respect to the supporting rod 66.

It is realized that the principles of my invention might be embodied in structural arrangements somewhat different from those shown and described herein, and I wish it to be understood that the invention is not to be considered as limited to the exact arrangements, devices and constructions shown and described except so far as the appended claims are expressly so limited.

I claim:

1. A seat construction for a motorcycle or the like comprising a saddle and a longitudinally extending spring connected at one end with the front end of the saddle and adapted for connection at the other end to the motorcycle, and to bear at a place substantially midway between its ends on a part of the motorcycle.

2. A seat construction for a motorcycle or the like comprising a saddle, a longitudinally extending spring connected at the front end with the saddle and adapted for connection at the other end with the motorcycle, and to bear at a place intermediate its ends on a part of the motorcycle, and a resilient support for the rear end of the saddle connected to said frame.

3. A seat construction for a motorcycle or the like comprising a saddle, a longitudinally extending spring connected at the front end with said saddle and adapted for hinged connection at the other end to the motorcycle and to bear at a place intermediate its ends on a part of the motorcycle and means providing a resilient support for the rear end of the saddle hinged to the cycle frame on the same axis with said spring.

4. A seat construction for a motorcycle or the like comprising a saddle, a leaf spring connected to the front end of the saddle, the other end of which spring is adapted to be pivoted to the motorcycle and the middle portion to bear on a part of the motorcycle, a yoke pivoted to the back of the saddle and provided with down turned legs, and coiled springs for connection at their upper ends to the motorcycle on the same axis with the leaf spring and connected at their lower ends with said yoke.

5. A seat construction for a motorcycle or the like comprising a seat and a spring extending from front to back of said seat and supporting the same with its rear end adapted for attachment to the motorcycle, and its middle portion for bearing on a part of the motorcycle without attachment thereto.

6. A seat construction for a motorcycle or the like comprising a seat and a spring attached to the front end of the seat and extending from front to back of the seat, supporting the same and adapted for hinged connection at its rear end to the motorcycle and for bearing on a part of the motorcycle, without attachment thereto, at a point substantially midway between its ends.

7. A seat construction for a motorcycle or the like comprising a seat and a spring attached to the forward end of the seat and extending lengthwise thereunder and adapted to be pivotally attached to the motorcycle body and to bear on a part of the motorcycle at a point substantially midway between said attachments.

8. A seat construction for a motorcycle or the like comprising a seat, a spring attached to the forward end of the seat and extending lengthwise thereunder and adapted to be pivotally attached to the motorcycle and to bear on a part of the motorcycle at a point intermediate said attachments, and means for resiliently supporting the rear end of the seat.

9. A seat construction for a motorcycle or the like comprising a transverse rod adapted to be supported on the motorcycle, a seat and a leaf spring attached at one end to the forward part of the seat and at the other to said rod and adapted to bear at a point intermediate its ends on a part of the motorcycle.

10. A seat construction for a motorcycle or the like comprising a transverse rod adapted to be supported on the motorcycle, a seat, a leaf spring attached at one end to the forward part of the seat and at the other to said rod, adapted to bear intermediate its ends on a part of the motorcycle, and coiled springs suspended from said rod for supporting the rear end of said seat.

11. In combination, a vehicle saddle, and a spring extending under and supporting said saddle and adapted to have a bearing at a point substantially midway between its ends whereby the oscillatory movements of said saddle are substantially up and down movements.

12. In combination, a vehicle saddle, and a spring extending under and attached at one end to the front of the saddle and adapted for attachment at the other end to the vehicle and to have a bearing on the vehicle at a point substantially midway between its ends, whereby the oscillatory movements of said saddle are substantially vertical movements.

13. In combination, a vehicle saddle, a spring extending under and attached at one end to the front of the saddle and adapted for attachment at the other end to the vehicle and to have a bearing on the vehicle at a point intermediate its ends, whereby the oscillatory movements of said saddle are substantially vertical movements, and means for resiliently supporting the rear end of said saddle on said vehicle.

14. A saddle construction comprising, in combination, a saddle frame, a cover, a leaf spring attached to the forward end of the frame, a supporting rod, the other end of the spring being pivoted to said rod and the spring adapted to bear on a fixed support intermediate its ends, a yoke pivoted to the rear portion of the saddle frame having downwardly extending legs, and a coiled spring suspended from said rod and engaged by said legs.

CARL A. NERACHER.